A. J. PARK.
Apparatus for Gathering and Elevating Hay.
No. 167,926. Patented Sept. 21, 1875.

WITNESSES:
F. McArdle
A. F. Terry

INVENTOR:
A. J. Park
BY Munn & Co
ATTORNEYS.

UNITED STATES PATENT OFFICE.

ALFRED J. PARK, OF VIRGINIA, MISSOURI.

IMPROVEMENT IN APPARATUS FOR GATHERING AND ELEVATING HAY.

Specification forming part of Letters Patent No. 167,926, dated September 21, 1875; application filed August 6, 1875.

*To all whom it may concern:*

Figure 1:
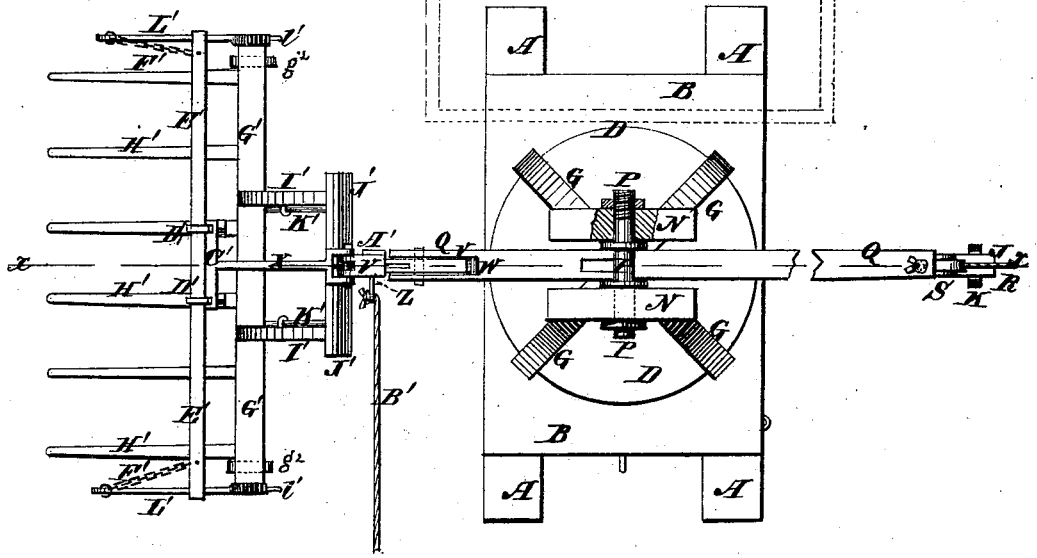
Figure 2:
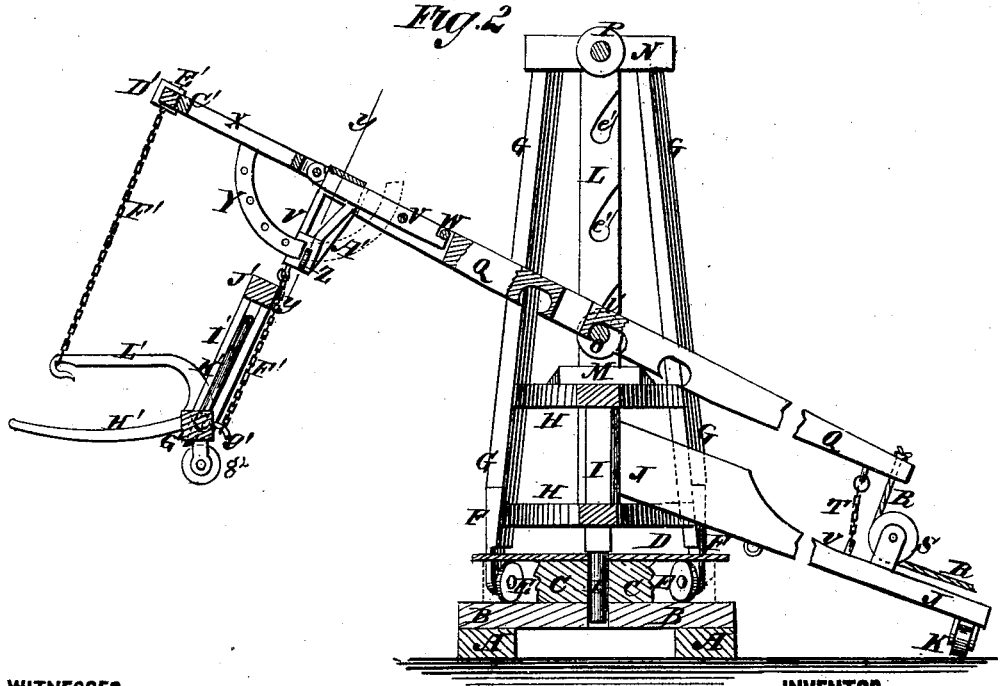

Be it known that I, ALFRED J. PARK, of Virginia, in the county of Bates and State of Missouri, have invented a new and useful Improvement in Apparatus for Gathering and Elevating Hay, and for other uses, of which the following is a specification:

Figure 1 is a top view of my improved machine, shown as arranged for elevating hay. Fig. 2 is a vertical section of the same, taken through the line $x$ $x$, Fig. 1.

Similar letters of reference indicate corresponding parts.

The invention will first be described in connection with drawing, and then pointed out in the claims.

A are the sills, the under side of the forward ends of which are beveled off to adapt the said sills to serve as runners for moving the apparatus from place to place. To the sills A is attached a platform, B, to which is attached a low drum or cylinder, C. To the top of the drum C is attached a metallic disk, D, which is made of a greater diameter than the diameter of the drum C, so that its edge may project beyond the face of the said drum C, to keep the wheels E down to their place. The wheels E rest upon the platform B at the edge of the drum C, and are pivoted to the sockets F, which pass up at the edge of the disk D, and receive, and are secured to, the lower ends of the four posts G. The posts G are connected at their lower ends, and at a little distance above their lower ends, by two frames, H, to the centers of which is attached a short central post, I, the lower end of which, or a journal formed upon or attached to said lower end, enters a socket in the center of the drum C, and thus pivots the upright frame-work, and relieves the wheels E from side strain. To the post I is rigidly attached the inner end of the sweep J, to the under side of the outer end of which is pivoted a small wheel, K, to roll upon the ground as the machine is operated. L are two parallel posts, the lower ends of which are attached to two blocks, M, attached to the upper frame H, upon the opposite sides of and equally distant from its center. The upper ends of the posts L are attached to two blocks, N, attached to the upper ends of the posts G. In the inner sides of the posts L are formed curved grooves $l'$, to receive the projecting ends of the flanged shaft O, which is designed to serve as a fulcrum for the hoisting-lever. The blocks N and the upper ends of the posts G and L are connected and held in their proper relative positions by a stationary flanged shaft, P, the ends of which have screw-threads cut upon them to receive nuts for securing them in place. The flanged shaft P is also designed to serve as a fulcrum for the hoisting-lever, when desired. Q is the hoisting-lever, in the under side of which are formed curved notches to receive the flanged shaft O or P. To the end of the long arm of the lever Q is attached the end of the hoisting-rope R, which passes around a pulley, S, pivoted to the upper side of the outer part of the sweep J, and to its other end is attached the horse. To the under side of the outer part of the hoisting-lever Q is attached the end of a short chain, T, which, when the load has been raised to the desired height, is hooked upon a hook, U, attached to the upper side of the sweep J, to support the load until it has been swung over the place where it is to be deposited.

Having thus described my invention, I claim as new and desire to secure by Letters Patent—

1. The combination of the base A B C D, the wheels and sockets E F, the posts G, the cross-frames H, and the central pivoting-post I, the sweep J, the grooved posts L, the adjustable flanged fulcrum-shaft O, the stationary flanged fulcrum-shaft P, the adjustable hoisting-lever Q, the hoisting-rope R, and the guide-pulley S, with each other, substantially as herein shown and described.

2. The combination, with the socketed frame F G and platform B, of the wheels E, the over-reaching disk D, and the drum C, all arranged as and for the purpose set forth.

3. The frame G, having a central post, I, that passes through drum C and the platform B, to take the strain from wheels, in the manner specified.

ALFRED J. PARK.

Witnesses:
 JOSHUA JENKINS,
 MOSES MARTIN.